United States Patent
Cho et al.

(10) Patent No.: US 10,714,260 B2
(45) Date of Patent: Jul. 14, 2020

(54) MULTILAYER CERAMIC CAPACITOR AND METHOD FOR MANUFACTURING THE SAME

(71) Applicant: SAMSUNG ELECTRO-MECHANICS CO., LTD., Suwon-si, Gyeonggi-do (KR)

(72) Inventors: Sung Min Cho, Suwon-si (KR); Young Wook Kim, Suwon-si (KR); Seung Mo Lim, Suwon-si (KR); Jung Min Kim, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/919,679

(22) Filed: Mar. 13, 2018

(65) Prior Publication Data

US 2018/0286589 A1  Oct. 4, 2018

(30) Foreign Application Priority Data

Apr. 3, 2017  (KR) .................. 10-2017-0042905
Jul. 13, 2017  (KR) .................. 10-2017-0088853

(51) Int. Cl.
*H01G 4/232* (2006.01)
*H01G 4/248* (2006.01)
(Continued)

(52) U.S. Cl.
CPC .......... *H01G 4/2325* (2013.01); *H01G 4/008* (2013.01); *H01G 4/228* (2013.01); *H01G 4/232* (2013.01);
(Continued)

(58) Field of Classification Search
USPC ... 361/321.1, 301.4, 321.2, 303, 305, 306.1, 361/321.3, 306.3
See application file for complete search history.

(56) References Cited

U.S. PATENT DOCUMENTS

| | | | |
|---|---|---|---|
| 5,107,394 A * | 4/1992 | Naito | H01C 17/281 29/25.42 |
| 2005/0012200 A1* | 1/2005 | Sawada | H01G 4/2325 257/698 |

(Continued)

FOREIGN PATENT DOCUMENTS

| | | |
|---|---|---|
| CN | 1873987 A | 12/2006 |
| CN | 101006027 A | 7/2007 |

(Continued)

OTHER PUBLICATIONS

Chinese Office Action dated Jul. 29, 2019 issued in Chinese Patent Application No. 201810257355.7 (with English translation).

*Primary Examiner* — Arun Ramaswamy
(74) *Attorney, Agent, or Firm* — Morgan, Lewis & Bockius LLP

(57) ABSTRACT

A multilayer ceramic capacitor includes a body including first and second internal electrodes facing each other with respective dielectric layers interposed therebetween, and first and second external electrodes disposed on an external surface of the body and electrically connected to the first and second internal electrodes, respectively. Each of the first and second external electrodes includes a first electrode layer containing any one selected from the group consisting of TiW, TiN, and TaN, or a combination thereof, and a second electrode layer disposed on the first electrode layer.

12 Claims, 14 Drawing Sheets

(51) Int. Cl.
*H01G 4/228* (2006.01)
*H01G 4/008* (2006.01)
*H01G 4/30* (2006.01)
H01G 4/224 (2006.01)
H01G 4/12 (2006.01)

(52) U.S. Cl.
CPC .............. *H01G 4/30* (2013.01); *H01G 4/12* (2013.01); *H01G 4/224* (2013.01); *H01G 4/248* (2013.01)

(56) References Cited

U.S. PATENT DOCUMENTS

| | | |
|---|---|---|
| 2006/0145401 A1 | 7/2006 | Mihara et al. |
| 2006/0267019 A1 | 11/2006 | Kim et al. |
| 2007/0142210 A1 | 6/2007 | Muto et al. |
| 2015/0380161 A1 | 12/2015 | Lim et al. |

FOREIGN PATENT DOCUMENTS

| | | |
|---|---|---|
| JP | S62-242325 A | 10/1987 |
| JP | 01-152712 A | 6/1989 |
| JP | 10-41183 A | 2/1998 |
| JP | 2004-311676 A | 11/2004 |
| KR | 10-2005-0121669 A | 12/2005 |
| KR | 10-2016-0001026 A | 1/2016 |

\* cited by examiner

MULTILAYER CERAMIC CAPACITOR AND METHOD FOR MANUFACTURING THE SAME

CROSS-REFERENCE TO RELATED APPLICATION(S)

This application claims the benefit of priority to Korean Patent Application Nos. 10-2017-0042905 filed on Apr. 3, 2017 and 10-2017-0088853 filed on Jul. 13, 2017 in the Korean Intellectual Property Office, the disclosures of which are incorporated herein by reference in their entirety.

TECHNICAL FIELD

The present disclosure relates to a multilayer ceramic capacitor and a method for manufacturing the same.

BACKGROUND

In accordance with the trend for miniaturization and high capacitance in multilayer ceramic capacitors (MLCC), the importance of increasing an efficient volume ratio (a ratio of a volume contributing to capacitance to an overall volume) of the multilayer ceramic capacitor has increased.

As a method for increasing the efficient volume ratio, a method for performing cutting so as to expose internal electrodes without a margin portion and attaching an insulating dielectric layer thereto, as well as a method for decreasing a thickness of external electrodes, or the like, has been discussed.

Particularly, the method for decreasing a thickness of external electrodes is effective, but various problems may be caused by thinning the external electrodes in order to decrease the thickness.

SUMMARY

An aspect of the present disclosure may provide a multilayer ceramic capacitor capable of having external electrodes having high durability against diffusion and excellent moisture resistance reliability against a plating solution, while improving an efficient volume ratio by thinning external electrodes of the multilayer ceramic capacitor.

According to an aspect of the present disclosure, a multilayer ceramic capacitor may include: a body including first and second internal electrodes facing each other with respective dielectric layers interposed therebetween; and first and second external electrodes disposed on an external surface of the body and electrically connected to the first and second internal electrodes, respectively, wherein each of the first and second external electrodes includes: a first electrode layer containing any one selected from the group consisting of TiW, TiN, and TaN, or a combination thereof; and a second electrode layer disposed on the first electrode layer.

According to another aspect of the present disclosure, a method for manufacturing a multilayer ceramic capacitor may include: preparing a body including first and second internal electrodes facing each other with respective dielectric layers interposed therebetween; forming a first electrode layer containing any one selected from the group consisting of TiW, TiN, and TaN or a combination thereof on an entire external surface of the body; forming a second electrode layer on the first electrode layer; forming a protection layer on portions of the second electrode layer on which the first and second external electrodes are formed; and removing exposed first and second electrode layers by etching the body on which the protection layer is formed, and forming first and second external electrodes disposed on an external surface of the body by removing the protection layer.

According to another aspect of the present disclosure, a method for manufacturing a multilayer ceramic capacitor may include: preparing a body including first and second internal electrodes facing each other with respective dielectric layers interposed therebetween; forming a protection layer on a portion of the body except for first and second external electrode formation regions of the body; forming a first electrode layer containing any one selected from the group consisting of TiW, TiN, and TaN or a combination thereof on the first and second external electrode formation regions of the body; forming a second electrode layer on the first electrode layer; and forming first and second external electrodes disposed on an external surface of the body by removing the protection layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
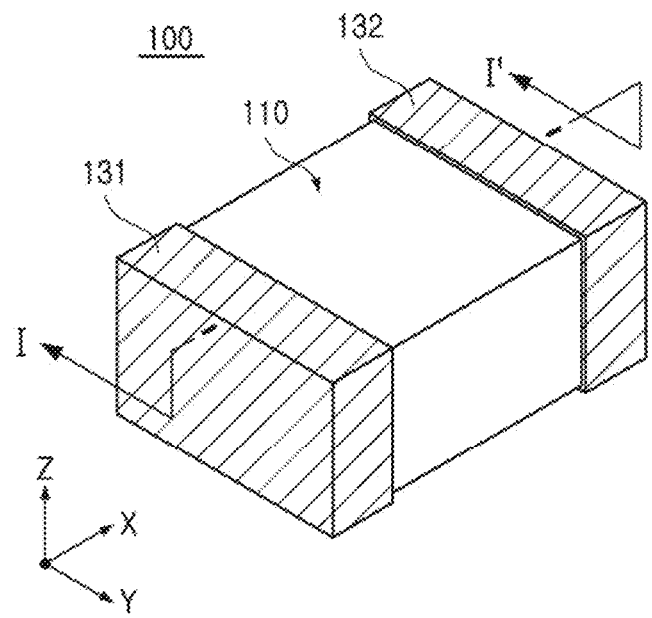
FIG. 1 is a schematic perspective view illustrating a multilayer ceramic capacitor according to an embodiment in the present disclosure.

Hereinafter, embodiments of the present disclosure will now be described in detail with reference to the accompanying drawings. In the accompanying drawings, shapes, sizes and the like, of the components may be exaggerated or shortened for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers and/or sections, any such members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as 'above,' 'upper,' 'below,' and 'lower' and the like, may be used herein for ease of description to describe one element's relationship relative to another element(s) as shown in the figures. It will be understood that spatially relative terms are intended to encompass different orientations of the device in use or operation, in addition to the orientation depicted in the figures. For example, if the device in the figures is turned over, elements described as 'above,' or 'upper' relative to other elements would then be oriented 'below,' or 'lower' relative to the other elements or features. Thus, the term 'above' can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises,' and/or 'comprising' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone, in combination or in partial combination.

The contents of the present disclosure described below may have a variety of configurations and propose only a required configuration herein, but are not limited thereto.

In the accompanying drawings, an X direction may refer to a first direction or a length direction, a Y direction may refer to a second direction or a width direction, and a Z direction may refer to a third direction, a thickness direction, or a stacking direction, but the directions are not limited thereto.

Multilayer Ceramic Capacitor

Figure 2:
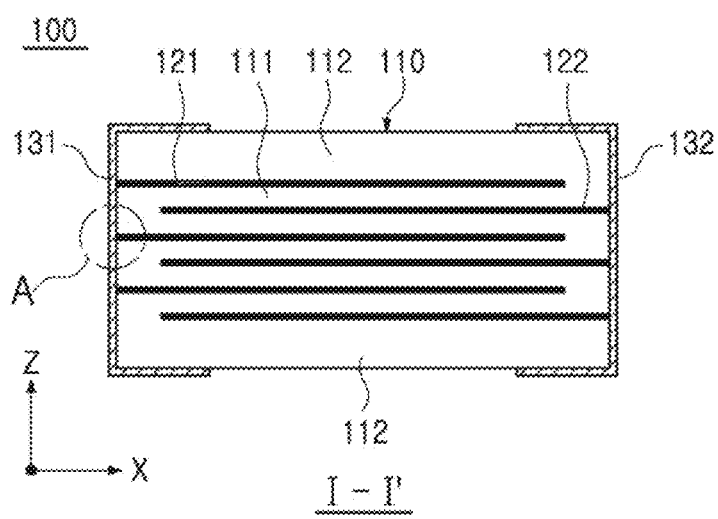
FIG. 2 is a schematic cross-sectional view taken along line I-I' of FIG. 1.
Figure 3:
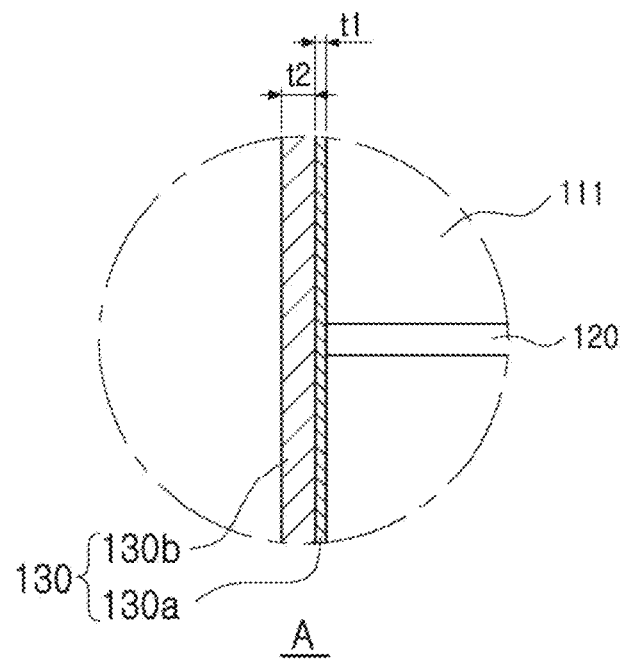
FIG. 3 is a schematic enlarged cross-sectional view of part A of FIG. 2.

FIG. 1 is a schematic perspective view illustrating a multilayer ceramic capacitor according to an embodiment in the present disclosure. FIG. 2 is a schematic cross-sectional view taken along line I-I' of FIG. 1. FIG. 3 is a schematic enlarged cross-sectional view of part A of FIG. 2.

Figure 4:
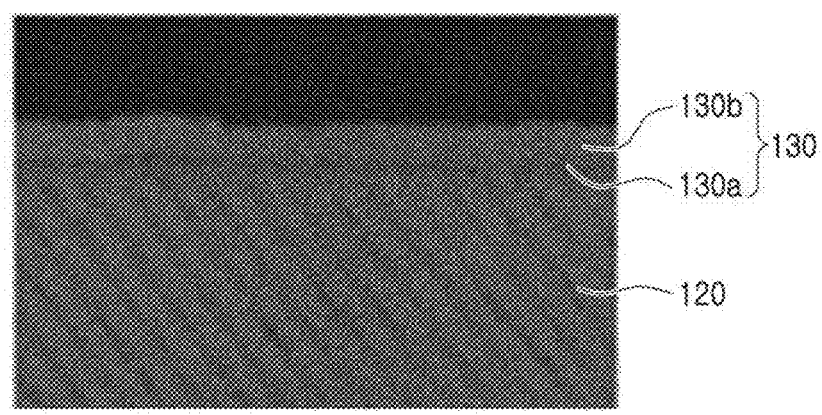
FIG. 4 is a scanning electron microscope (SEM) photograph of a portion in which an internal electrode and an external electrode come into contact with each other.

Further, FIG. 4 is a scanning electron microscope (SEM) photograph of a portion in which an internal electrode and an external electrode come into contact with each other.

Hereinafter, a multilayer ceramic capacitor 100 according to an embodiment in the present disclosure will be described with reference to FIGS. 1 through 4.

Referring to FIG. 1, the multilayer ceramic capacitor 100 includes a body 110 and first and second external electrodes 131 and 132 disposed on an external surface of the body 110.

The body 110 has first and second main surfaces opposing each other in the thickness (Z) direction, first and second side surfaces opposing each other in the width (Y) direction, and first and second end surfaces opposing each other in the length (X) direction.

For example, as illustrated in FIG. 1, the first and second external electrodes 131 and 132 are formed on the first and second end surfaces of the body 110 and extended to portions of the first and second main surfaces and the first and second side surfaces adjacent thereto, respectively, but are not limited thereto.

Here, portions of the first and second external electrodes 131 and 132 extended from the first and second end surfaces to surfaces adjacent to the first and second end surfaces may be defined as band portions.

Referring to FIG. 2, the body 110 includes dielectric layers 111 and first and second internal electrodes 121 and 122 disposed to face each other with each of the dielectric layers 111 interposed therebetween.

The body 110 may be formed by stacking a plurality of dielectric layers 111 in the thickness (Z) direction and then sintering the stacked dielectric layers 111. In this case, a shape and a dimension of the body 110 and the number of stacked dielectric layers 111 are not limited to those of the present embodiment illustrated in the accompanying drawings.

The plurality of dielectric layers 111 configuring the body 110 may be in a sintered state, and adjacent dielectric layers 111 may be integrated with each other so that boundaries therebetween are not readily apparent without a scanning electron microscope (SEM).

A material forming the dielectric layer 111 is not particularly limited as long as sufficient capacitance may be obtained, but may be, for example, barium titanate ($BaTiO_3$) powder. The material forming the dielectric layer 111 may further contain various ceramic additives, an organic solvent, a plasticizer, a binder, a dispersant, or the like, according to the object of the present disclosure in addition to the powder such as barium titanate ($BaTiO_3$) powder, or the like.

The first and second internal electrodes 121 and 122, a pair of electrodes having different polarities from each other, are alternately exposed in the stacking direction of the dielectric layer 111 to the first and second end surfaces of the body 110 in the length (X) direction, and are electrically insulated from each other by each of the dielectric layers 111 disposed therebetween.

The first and second internal electrodes 121 and 122 may be alternately exposed to the first and second end surfaces of the body 110 in the length (X) direction, such that the first and second internal electrodes 121 and 122 are connected to the first and second external electrodes 131 and 132 disposed on the external surface of the body 110, respectively.

A thickness of the first and second internal electrodes 121 and 122 may be determined depending on the use thereof.

For example, the thickness of first and second internal electrodes 121 and 122 may be in a range of 0.2 μm to 1.0 μm in consideration of a size of the body 110, but is not necessarily limited thereto.

The first and second internal electrodes 121 and 122 may contain a single conductive metal such as nickel (Ni), copper (Cu), palladium (Pd), silver (Ag), lead (Pb), platinum (Pt), or the like, or alloys thereof, but are not limited thereto.

Cover layers 112 formed by stacking dielectric layers on which an internal electrode is not formed may be formed in upper and lower portions of the body 110, respectively. The cover layer 112 may serve to maintain reliability of the multilayer ceramic capacitor against external impact.

Structures of the first and second external electrodes 131 and 132 of the multilayer ceramic capacitor according to an embodiment will be described in more detail with reference to FIG. 3. FIG. 3 is an enlarged view of the first external electrode 131, but a description for the first external electrode 131 may also be applied to the second external electrode 132. Further, hereinafter, for clarity of explanation, the internal electrode will be denoted by reference numeral '120' and the external electrode will be denoted by reference numeral '130'.

In the multilayer ceramic capacitor according to an embodiment in the present disclosure, the external electrode 130 may include a first electrode layer 130a and a second electrode layer 130b.

According to the related art, at the time of forming an external electrode, a paste containing a conductive metal has been used, and a dipping method of dipping a surface of a body to which internal electrodes were exposed into the paste has been mainly used.

However, the external electrode formed using the dipping method had a problem in that the external electrode was excessively thick due to interfacial tension of the paste.

On the contrary, in order to increase the efficient volume ratio, a ratio of a volume contributing to capacitance to an entire volume of a multilayer ceramic capacitor, there is a need to decrease a thickness of external electrodes, but there was a problem in that at the time of forming plating layers on the external electrodes in order to improve connectivity and mounting properties of the multilayer ceramic capacitor, a plating solution may infiltrate into a body to deteriorate reliability of the multilayer ceramic capacitor.

That is, in a case of forming the external electrodes using the paste containing the conductive paste as in the related art, there is a limitation in increasing the efficient volume ratio of the multilayer ceramic capacitor.

Therefore, in the multilayer ceramic capacitor 100 according to an embodiment in the present disclosure, the external electrode 130 may include the first electrode layer 130a and the second electrode layer 130b, and the first and second electrode layers 130a and 130b may be formed using a method different from a method for dipping the body 110 in a paste.

For example, the first and second electrode layers 130a and 130b may be formed using a thin film deposition method such as a sputtering method, a chemical vapor deposition (CVD) method, a physical vapor deposition (PVD) method, a spin coating method, an atomic layer deposition (ALD) method, a pulsed laser deposition (PLD) method, or an electroless plating method, but is not limited thereto. Hereinafter, for clarity of explanation, description will be provided based on a case in which the first and second electrode layers 130a and 130b are sputtering layers formed using the sputtering method.

Referring to FIG. 4, it may be appreciated that in a case of forming the first and second electrode layers 130a and 130b by the sputtering method, a density is high as compared to a case of forming an electrode layer using a conductive paste.

That is, as an external electrode 130 is thinned, a problem in moisture resistance reliability of a multilayer ceramic capacitor may occur, but in the multilayer ceramic capacitor 100 according to an embodiment in the present disclosure, since the density of the first and second electrode layers 130a and 130b is higher than that in the dipping method according to the related art, moisture resistance reliability may be maintained or improved.

In order to increase electrical conductivity of the external electrode 130, the second electrode layer 130b may contain any one selected from the group consisting of Cu and Al or alloys thereof.

In this case, the first electrode layer 130a may be disposed between the second electrode layer 130b and the body 110.

The first electrode layer 130a may serve to improve close adhesion and adhesion between the body 110 and the second electrode layer 130b.

Further, the first electrode layer 130a may serve as a diffusion prevention layer preventing metal atoms contained in the second electrode layer 130b from being diffused to the internal electrode 120 at the time of heat treatment.

In a case in which the metal atoms contained in the second electrode layer 130b are diffused to the internal electrode 120 at the time of heat treatment, a possibility that cracks will occur in a dielectric layer 111 in the vicinity of a distal end of the internal electrode 120 or a delamination phenomenon will occur may be increased.

However, since in the multilayer ceramic capacitor 100 according to an embodiment in the present disclosure, the first electrode layer 130a may contain anyone selected from the group consisting of TiW, TiN, and TaN, or a combination thereof, reliability of the multilayer ceramic capacitor may be improved by improving close adhesion and adhesion between the second electrode layer 130b and the body 110 and preventing the metal atoms contained in the second electrode layer 130b from being diffused to the internal electrode 120.

Table 1 illustrates results obtained by imaging fine structures of exposed portions of internal electrodes to confirm whether or not delamination or a crack occurs in the exposed portions of the internal electrodes, after forming first electrode layers of external electrodes of multilayer ceramic capacitors by sputtering Ti, Cr, NiCr, TiW, TiN, or TaN, respectively, to complete the multilayer ceramic capacitors. The first electrode layer was formed to have a thickness of 50 nm.

TABLE 1

| Sample | Material of First Electrode Layer | Does Delamination or Crack occur in Internal Electrode? |
|---|---|---|
| 1 | Ti | ○ |
| 2 | Cr | ○ |
| 3 | NiCr | Δ |
| 4 | TiW | x |
| 5 | TiN | x |
| 6 | TaN | x |

At the time of determining whether or not the delamination or crack occurred in the internal electrodes, after manufacturing 100 samples, (per capacitor) and imaging fine structures of exposed portions of internal electrodes, a case in which the delamination or cracks occurred in three or more samples was represented by "○", a case in which the delamination or cracks occurred in one or two samples was represented by "Δ", and a case in which delamination or cracks did not occurred in any sample was represented by "x".

As illustrated in Table 1, it may be confirmed that since in the multilayer ceramic capacitor 100 according to an embodiment in the present disclosure, the first electrode layer 130a contains anyone selected from the group consisting of TiW, TiN, and TaN or a combination thereof, reliability of the multilayer ceramic capacitor may be improved by preventing the metal atoms contained in the second electrode layer 130b from being diffused to the internal electrode 120.

Further, the first and second electrode layers 130a and 130b of the multilayer ceramic capacitor 100 according to an embodiment in the present disclosure may have significantly thin thicknesses as compared to external electrodes formed using the dipping method according to the related art.

A thickness $t_1$ of the first electrode layer 130a may be 30 nm to 70 nm, and a thickness $t_2$ of the second electrode layer 130b may be 0.5 μm to 3 μm.

As described above, since the first and second electrode layers 130a and 130b of the multilayer ceramic capacitor 100 according to an embodiment in the present disclosure may have significantly thin thicknesses as compared to the external electrodes formed using the dipping method according to the related art, the efficient volume ratio of the multilayer ceramic capacitor may be increased.

When the thickness $t_1$ of the first electrode layer 130a is less than 30 nm, it may be difficult to prevent the metal atoms in the second electrode layer 130b from being diffused to the internal electrode 120, and when the thickness $t_1$ of the first electrode layer 130a is more than 70 nm, electrical conductivity may be decreased due to an increase in a ratio of the first electrode layer 130a in the external electrode 130.

When the thickness $t_2$ of the second electrode layer 130b is less than 0.5 μm, moisture resistance reliability of the multilayer ceramic capacitor may be deteriorated, and when the thickness $t_2$ of the second electrode layer 130b is more than 3 μm, an effect of increasing the efficient volume ratio of the multilayer ceramic capacitor may be insufficient.

Figure 5:
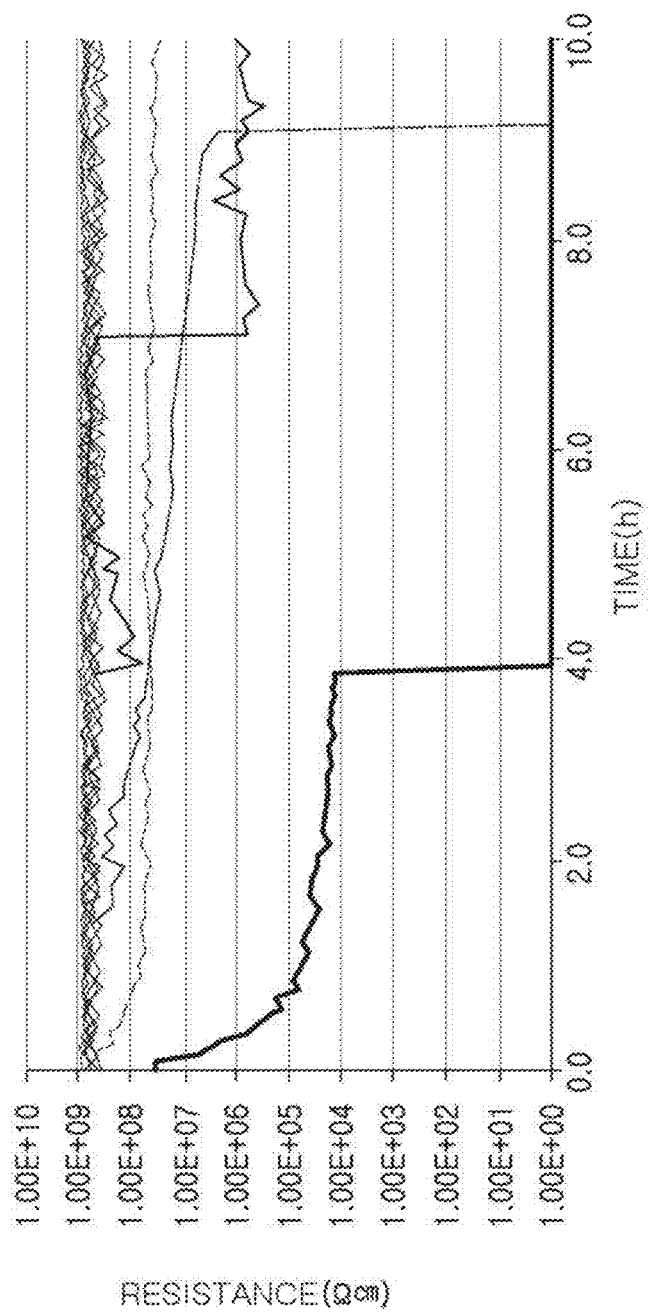
FIG. 5 illustrates a result obtained by measuring moisture resistance reliability of a multilayer ceramic capacitor in a Comparative Example.
Figure 6:
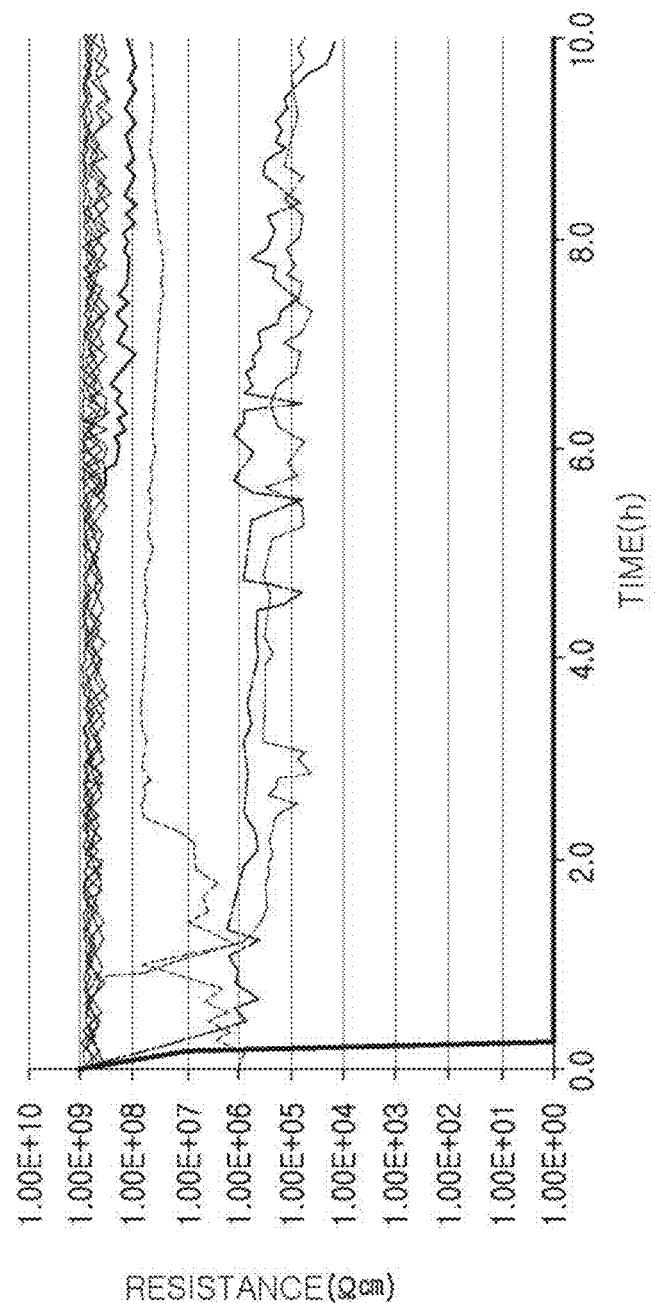
FIGS. 6 and 7 illustrate results obtained by measuring moisture resistance reliability of multilayer ceramic capacitors in Inventive Examples, respectively.
Figure 7:
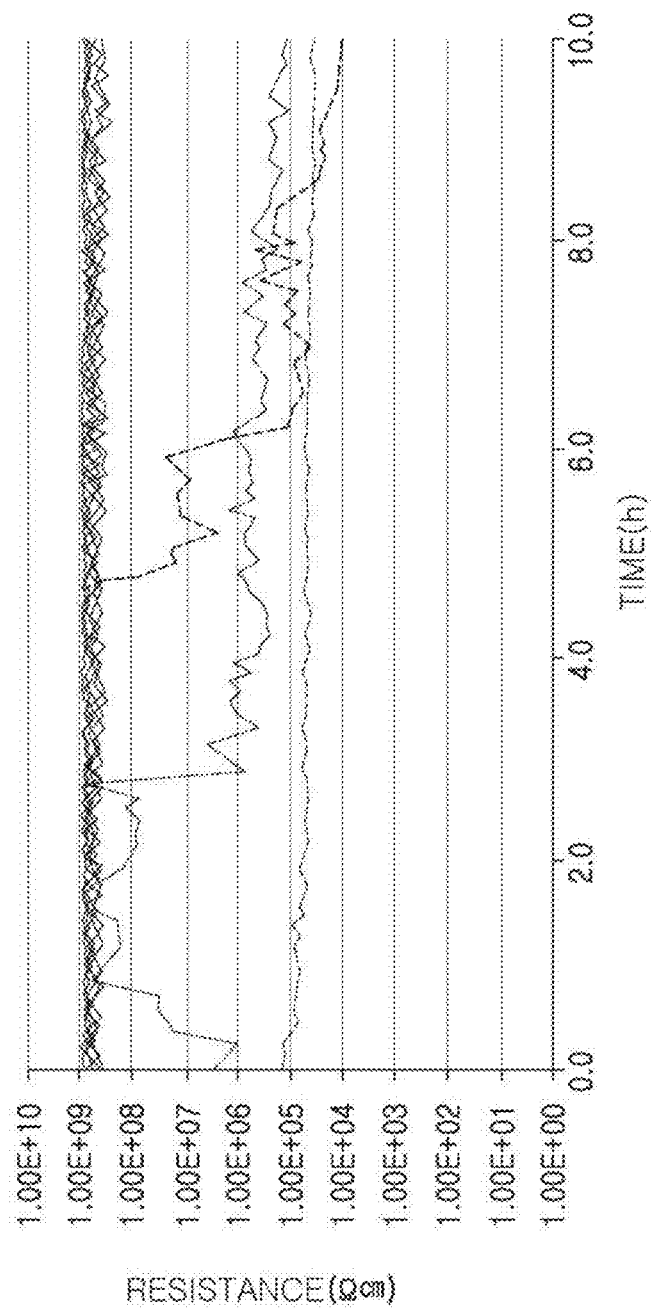

FIG. 5 illustrates a result obtained by measuring moisture resistance reliability of a multilayer ceramic capacitor in Comparative Example. FIGS. 6 and 7 illustrate results obtained by measuring moisture resistance reliability of multilayer ceramic capacitors in Inventive Examples, respectively.

In the multilayer ceramic capacitor in Comparative Example of FIG. 5, an external electrode was formed using a dipping method using a paste as in the related art. In the multilayer ceramic capacitor in Inventive Example 1 of FIG. 6, a first electrode layer 130a was formed to have a thickness of 50 nm by sputtering, and a second electrode layer 130b was formed to have a thickness of 1 μm by sputtering. Further, in the multilayer ceramic capacitor in Inventive Example 2 of FIG. 7, a first electrode layer 130a was formed to have a thickness of 50 nm by sputtering, and a second electrode layer 130b was formed to have a thickness of 2 μm by sputtering. The multilayer ceramic capacitors used in FIGS. 5 through 7 were multilayer ceramic capacitors before plating layers were formed.

Moisture resistance reliability was evaluated by manufacturing 40 samples (per each proto-type chip ceramic capacitor), applying a voltage of 9.45 V to the samples (the proto-type chip ceramic capacitors) at a humidity of 85% and a temperature of 85° C., and measuring resistance for 10 hours.

Referring to FIG. 5, it may be appreciated that in Comparative Example in which the external electrode of the multilayer ceramic capacitor was formed using the dipping method using the paste as in the related art, the thickness of the external electrode was enough to maintain moisture resistance reliability of 90% or more. In detail, it may be confirmed that among 40 samples of the multilayer ceramic capacitor in Comparative Example, three samples did not pass a moisture resistance reliability test, such that moisture resistance reliability was 92.5%.

Referring to FIG. 6, it may be appreciated that in multilayer ceramic capacitor in Inventive Example 1 according to the present disclosure, the first electrode layer 130a had a thickness of 50 nm and a second electrode layer 130b had a thickness of 1 μm, such that a total thickness of the external electrode was significantly thin. However, it may be confirmed that even though the thickness of the external electrode was thin, among 40 samples of the multilayer ceramic capacitor in Inventive Example 1, three samples did not pass the moisture resistance reliability test, such that moisture resistance reliability was 92.5%. That is, it may be appreciated that the multilayer ceramic capacitor in Inventive Example 1 had moisture resistance reliability equivalent to that of the multilayer ceramic capacitor in Comparative Example, and even in a case in which the multilayer ceramic capacitor did not pass the moisture resistance reliability test, resistance of a predetermined level was at least maintained.

Referring to FIG. 7, it may be appreciated that in multilayer ceramic capacitor in Inventive Example 2 according to the present disclosure, the first electrode layer 130a had a thickness of 50 nm, and a second electrode layer 130b had a thickness of 2 μm, such that a total thickness of the external electrode was significantly thin. However, it may be confirmed that even though the thickness of the external electrode was thin, among 40 samples of the multilayer ceramic capacitor in Inventive Example 2, three samples did not pass the moisture resistance reliability test, such that moisture resistance reliability was 92.5%. That is, it may be appreciated that the multilayer ceramic capacitor in Inventive Example 2 had moisture resistance reliability equivalent to that of the multilayer ceramic capacitor in Comparative Example, and even in a case in which the multilayer ceramic capacitor did not pass the moisture resistance reliability test, resistance of a predetermined level was at least maintained. Particularly, in the multilayer ceramic capacitor in Inventive Example 2, the external electrode had a sufficient thickness, such that there is no case in which resistance was 0 unlike the multilayer ceramic capacitor in Inventive Example 1.

As a result, in the multilayer ceramic capacitor according to an embodiment in the present disclosure, the efficient volume ratio may be increased as compared to the related art, and moisture resistance reliability may be improved so as to be equal to or more excellent than that in the related art.

Figure 8:
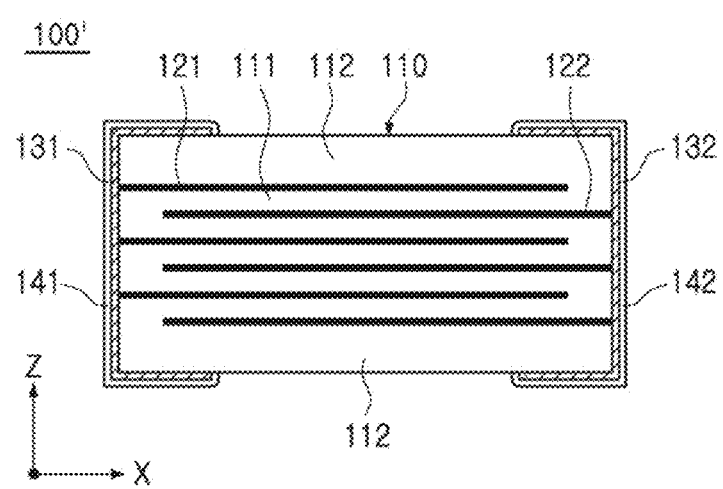
FIG. 8 is a schematic cross-sectional view illustrating a multilayer ceramic capacitor according to an embodiment in the present disclosure, further including a plating layer.

FIG. 8 is a schematic cross-sectional view illustrating a multilayer ceramic capacitor 100' according to an embodiment in the present disclosure, further including a plating layer.

Referring to a multilayer ceramic capacitor 100' illustrated in FIG. 8, first and second plating layers 141 and 142 may be formed on the first and second external electrodes 131 and 132, respectively. The first and second plating layers 141 and 142 may be formed of one of copper (Cu), silver (Ag), nickel (Ni), tin (Sn), and the like, or alloys thereof, but are not limited thereto. The first and second plating layers 141 and 142 may be formed using an electroplating method or electroless plating method, but are not limited thereto.

The first and second plating layers 141 and 142 may be disposed to cover end portions of the first and second external electrodes 131 and 132, respectively.

As described above, since in the multilayer ceramic capacitor 100' according to an embodiment in the present disclosure, first and second electrode layers 130a and 130b are formed using a sputtering method to have a high density, even though the first and second external electrodes 131 and 132 have a thin thicknesses, moisture resistance reliability may be excellent. Therefore, even in a case of forming the first and second plating layers 141 and 142, reliability of the multilayer ceramic capacitor 100' may be maintained.

Method for Manufacturing Multilayer Ceramic Capacitor

Figure 9:
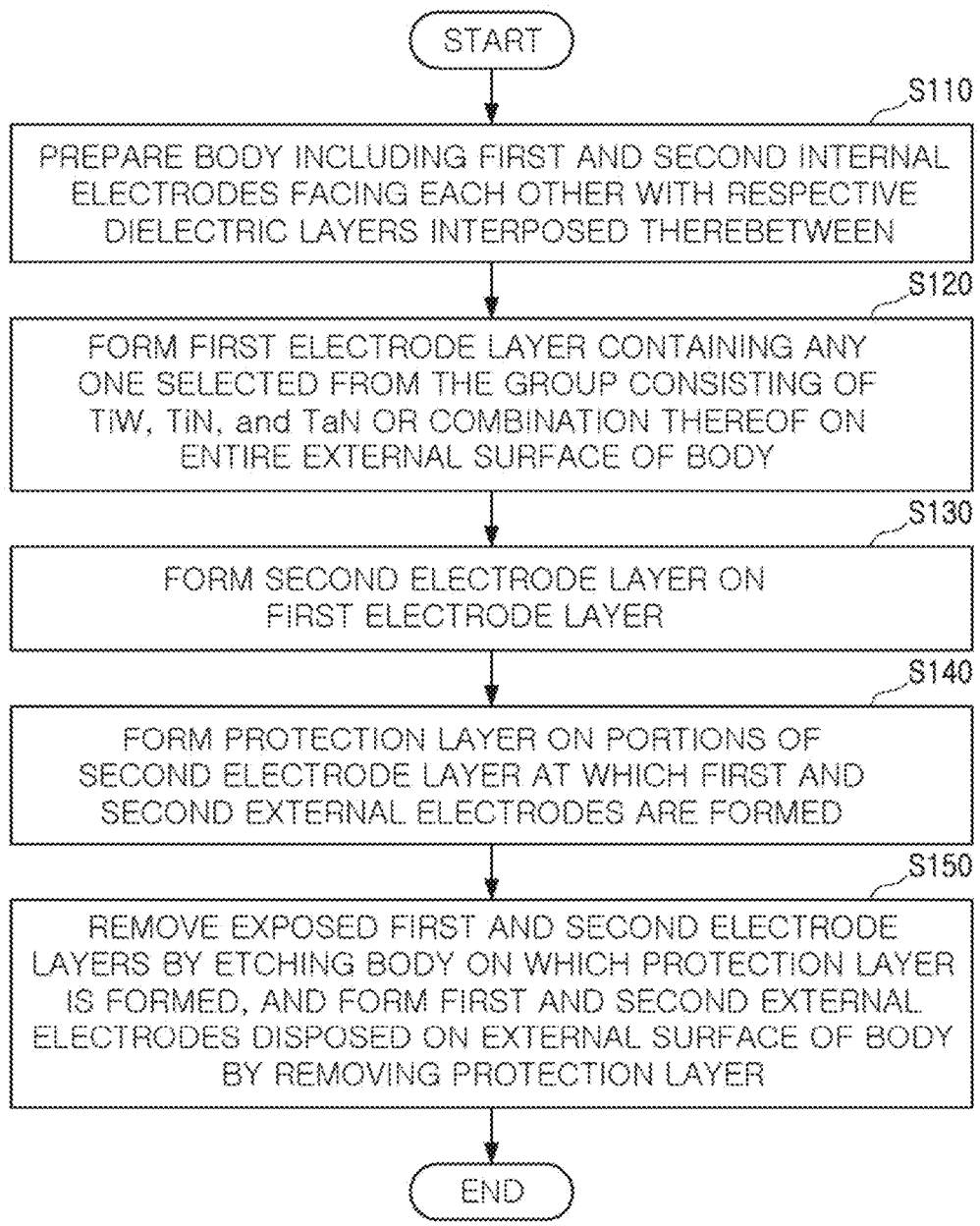
FIG. 9 is a flow chart illustrating a method for manufacturing a multilayer ceramic capacitor according to another embodiment in the present disclosure.

FIG. 9 is a flow chart illustrating a method for manufacturing a multilayer ceramic capacitor according to another embodiment in the present disclosure, and FIGS. 10 through 15 are schematic perspective views illustrating a multilayer ceramic capacitor at various stages of manufacturing using the method for manufacturing a multilayer ceramic capacitor according to an embodiment in the present disclosure.

The method for manufacturing a multilayer ceramic capacitor according to an embodiment in the present disclosure may include: preparing a body including first and second internal electrodes facing each other with respective dielectric layers interposed therebetween (S110); forming a first electrode layer containing any one selected from the group consisting of TiW, TiN, and TaN or a combination thereof on an entire external surface of the body (S120); forming a second electrode layer on the first electrode layer (S130); forming a protection layer on portions of the second electrode layer at which the first and second external electrodes will be formed (S140); and removing exposed first and second electrode layers by etching the body on which the protection layer is formed, and forming first and second external electrodes disposed on an external surface of the body by removing the protection layer (S150).

Hereinafter, respective processes in the method for manufacturing a multilayer ceramic capacitor according to an embodiment in the present disclosure will be described with reference to FIGS. 10 through 15.

Figure 10:
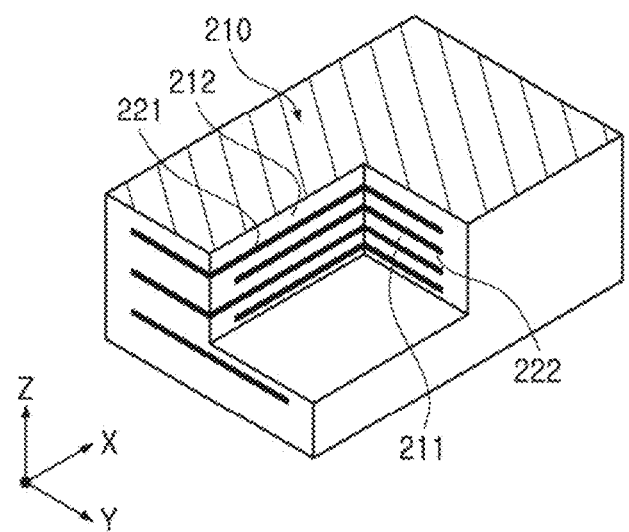
FIGS. 10 through 15 are schematic perspective views illustrating a multilayer ceramic capacitor at various stages of manufacturing using a method for manufacturing a multilayer ceramic capacitor according to another embodiment in the present disclosure.

First, referring to FIG. 10, a body 210 including first and second internal electrodes 221 and 222 facing each other with respective dielectric layers 211 interposed therebetween may be prepared (S110).

Slurry containing powder such as a barium titanate (BaTiO$_3$) powder, or the like, is applied to and dried on a carrier film to prepare a plurality of ceramic sheets.

The ceramic sheet may be manufactured in a sheet form with a thickness of several μm by mixing the ceramic powder such as the barium titanate (BaTiO$_3$) powder, or the like, a binder, a solvent, and the like, to prepare slurry and applying the slurry using by a doctor blade method.

Next, a conductive paste containing a conductive metal may be prepared. The conductive metal may be a single metal such as nickel (Ni), copper (Cu), palladium (Pd), silver (Ag), lead (Pb), platinum (Pt), or the like, or alloys thereof, and a conductive paste for an internal electrode having an average particle size of 0.1 to 0.2 μm and containing 40 to 50 wt % of the conductive metal may be prepared.

An internal electrode pattern may be formed by applying the conductive paste for an internal electrode to the ceramic sheet using a printing method, or the like. As a printing method of the conductive paste, a screen printing method, a gravure printing method, or the like, may be used, but the printing method is not limited thereto.

A laminate including first and second internal electrodes 221 and 222 therein may be formed by stacking the ceramic sheets on which the internal electrode pattern is printed and stacking the ceramic sheets on which the internal electrode pattern is not printed on and below the stacked ceramic sheets. Here, the number of stacked ceramic sheets on which the internal electrode pattern is printed may be adjusted depending on capacitance of the multilayer ceramic capacitor. The ceramic sheets on which the internal electrode pattern is not printed become the cover parts 212 disposed in upper and lower portions of the body 210.

Thereafter, the body 210 may be formed by compressing and sintering the laminate.

Figure 11:
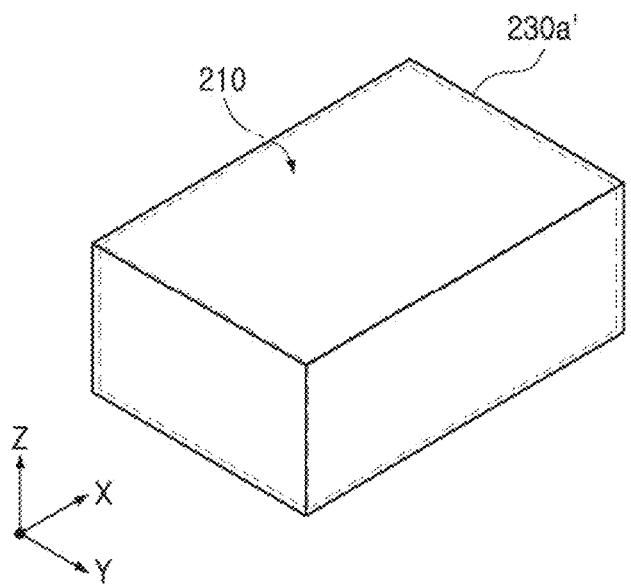

Referring to FIG. 11, after the body 210 is formed, a first electrode layer 230a' may be formed on the entire external surface of the body 210 (S120).

The first electrode layer 230a' may be formed using a thin film method such as a sputtering method, a chemical vapor deposition (CVD) method, a physical vapor deposition (PVD) method, a spin coating method, an atomic layer deposition (ALD) method, a pulsed laser deposition (PLD) method, or an electroless plating method, but is not limited thereto.

Hereinafter, for clarity of explanation, a description will be provided based on a case in which the first electrode layer 230a' is a sputtering layer formed using the sputtering method.

The first electrode layer 230a' may contain any one selected from the group consisting of TiW, TiN, and TaN, or a combination thereof.

That is, since the first electrode layer 230a' contains anyone selected from the group consisting of TiW, TiN, and TaN, or the combination thereof, in the forming of the second electrode layer to be described below, the second electrode layer may be easily adhered to the body 210, and diffusion of metal atoms contained in the second electrode layer to the internal electrode may be prevented.

The first electrode layer 230a' may be formed to have a thickness of 30 nm to 70 nm.

Figure 12:
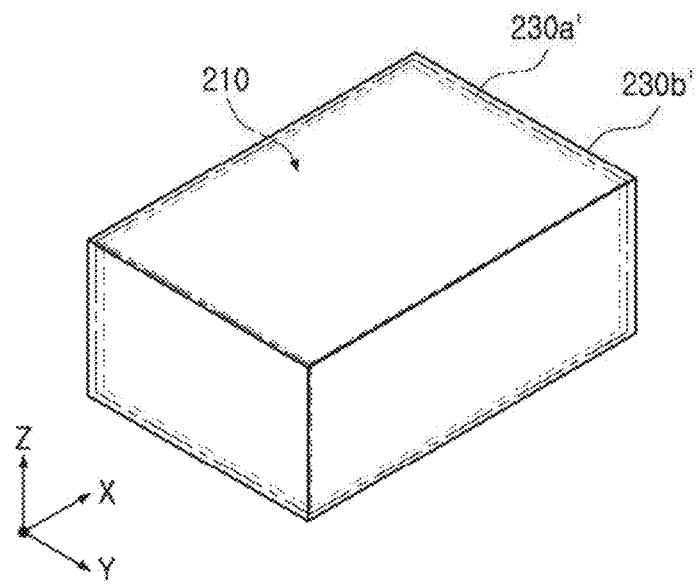

Next, referring to FIG. 12, a second electrode layer 230b' may be formed on the first electrode layer 230a' (S130).

The second electrode layer 230b' may be formed using a thin film method such as a sputtering method, a chemical vapor deposition (CVD) method, a physical vapor deposition (PVD) method, a spin coating method, an atomic layer deposition (ALD) method, a pulsed laser deposition (PLD) method, or an electroless plating method, but is not limited thereto. Hereinafter, for clarity of explanation, a description will be provided based on a case in which the second electrode layer 230b' is a sputtering layer formed using the sputtering method.

The second electrode layer 230b' may contain any one selected from the group consisting of Cu and Al, or alloys thereof.

That is, since the second electrode layer 230b' contains any one selected from the group consisting of Cu and Al, or the alloy thereof, electrical conductivity of the external electrodes may be improved.

The second electrode layer 230b' may be formed to have a thickness of 0.5 µm to 3 µm.

Figure 13:
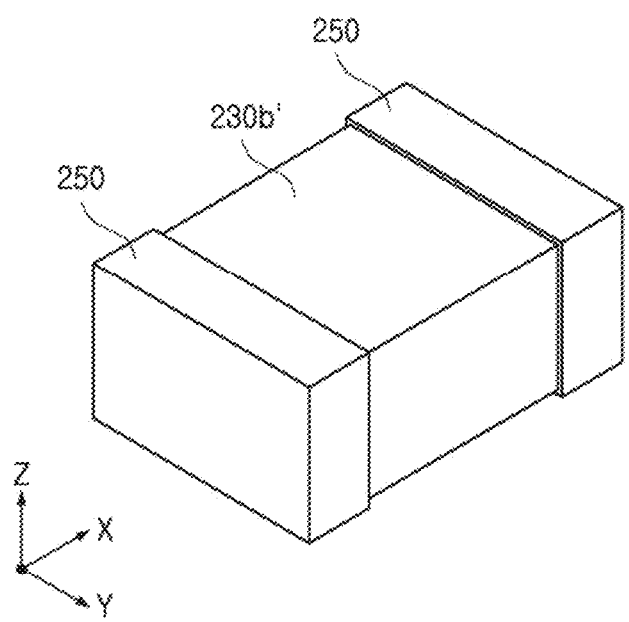

Next, referring to FIG. 13, a protection layer 250 may be formed on portions of the second electrode layer 230b' at which the first and second external electrodes will be formed (S140).

Here, the portions at which the first and second external electrodes will be formed may mean portions (band portions) extended from first and second end surfaces of the body 210 in a length (X) direction to surfaces of the body 210 adjacent to the first and second end surfaces of the body 210.

The protection layer 250 may be formed using a polymer resin, for example, an epoxy, but is not limited thereto.

Finally, the exposed first and second electrode layers 230a' and 230b' may be removed by etching the body 210 on which the protection layer 250 is formed, and then, the first and second external electrodes 231 and 232 may be formed by removing the protection layer 250 (S150).

Figure 14:
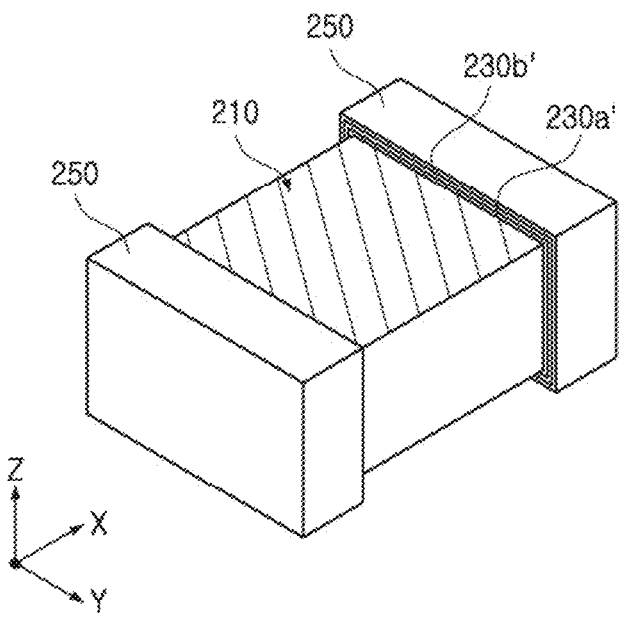

First, as illustrated in FIG. 14, the exposed first and second electrode layers 230a' and 230b' may be removed by etching the body 210 on which the protection layer 250 is formed. The first and second electrode layers 230a' and 230b' may be exposed in a band shape by the protection layer 250 in a central portion of the body 210 in the length direction, and the central portion of the body 210 in the length direction may be exposed in a band shape by removing the exposed first and second electrode layers 230a' and 230b' as described above. Although the first and second electrode layers 230a' and 230b' are viewed as a single layer due to thin thicknesses thereof, for clarity of explanation, the first and second electrode layers 230a' and 230b' are illustrated in FIG. 14 so as to be distinguished from each other.

Figure 15:
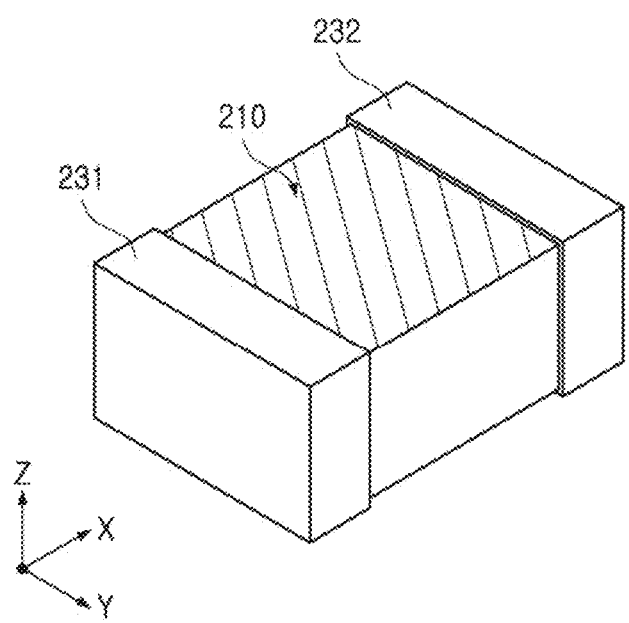

Finally, as illustrated in FIG. 15, the first and second external electrodes 231 and 232 may be formed by removing the protection layer 250, such that the multilayer ceramic capacitor may be completed.

Thereafter, if necessary, plating layers may be formed on the first and second external electrodes 231 and 232, but are not limited thereto.

The method for manufacturing a multilayer ceramic capacitor according to an embodiment in the present disclosure described above may have advantages in that the external electrodes may be deposited at once on end surfaces, side surfaces, and main surfaces of the body 210 without separately forming electrode layers on the end surfaces in order to improve connectivity between the internal electrodes and the external electrodes, and a paste is not used, and thus, there is no need to perform the sintering of the electrodes.

Figure 16:
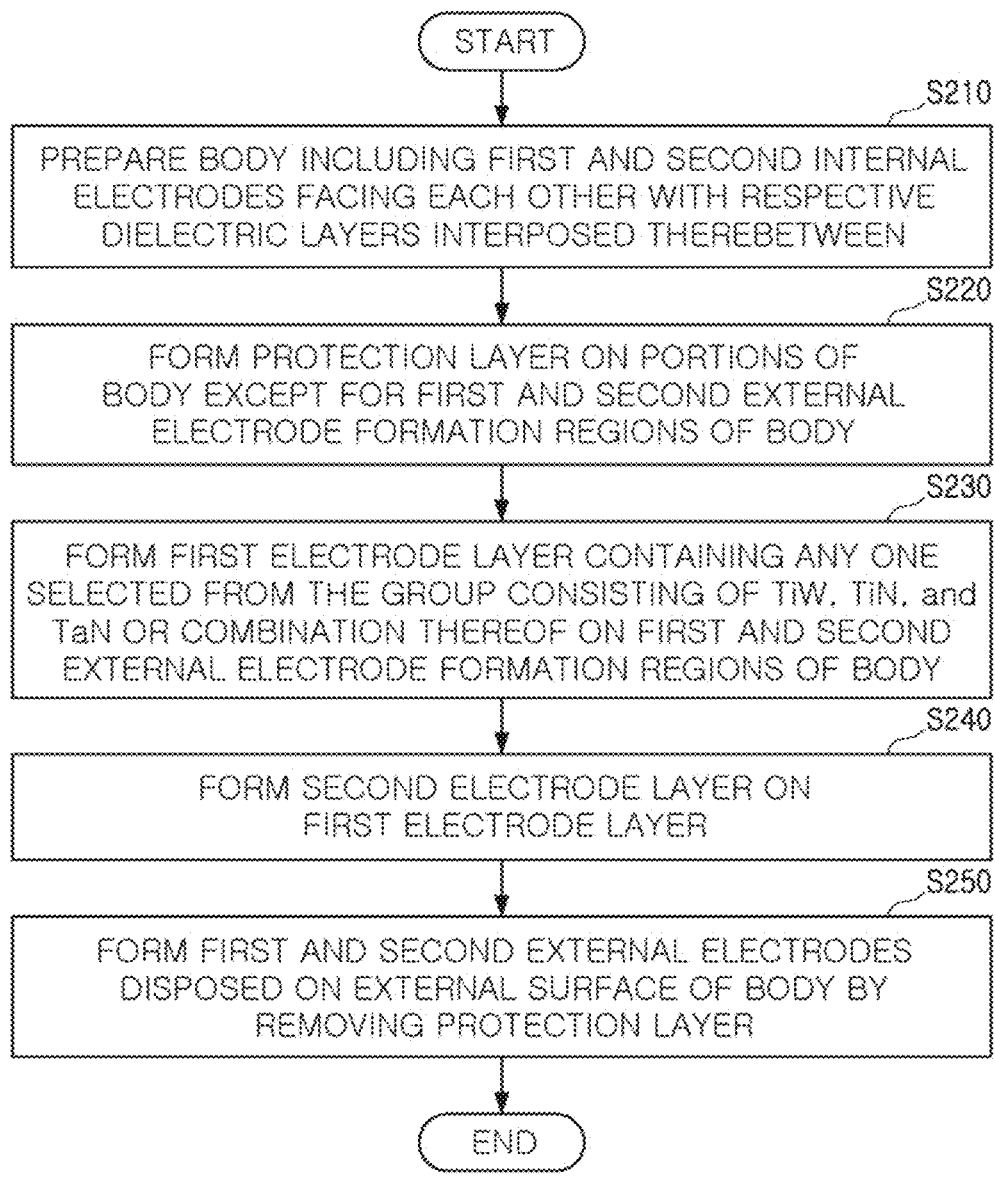
FIG. 16 is a flow chart illustrating a multilayer ceramic capacitor at various stages of manufacturing using a method for manufacturing a multilayer ceramic capacitor according to another embodiment in the present disclosure.

FIG. 16 is a flow chart illustrating a method for manufacturing a multilayer ceramic capacitor according to another embodiment in the present disclosure. FIGS. 17 through 21 are schematic perspective views illustrating a multilayer ceramic capacitor at various stages of manufacturing using a method for manufacturing a multilayer ceramic capacitor according to another embodiment in the present disclosure.

The method for manufacturing a multilayer ceramic capacitor according to another embodiment in the present disclosure may include: preparing a body including first and second internal electrodes facing each other with respective dielectric layers interposed therebetween (S210); forming a protection layer on a portion of the body except for first and second external electrode formation regions of the body (S220); forming a first electrode layer containing any one selected from the group consisting of TiW, TiN, and TaN or a combination thereof on the first and second external electrode formation regions of the body (S230); forming a second electrode layer on the first electrode layer (S240); and forming first and second external electrodes disposed on an external surface of the body by removing the protection layer (S250).

Hereinafter, respective processes in the method for manufacturing a multilayer ceramic capacitor according to another embodiment in the present disclosure will be described with reference to FIGS. 17 through 21.

Figure 17:
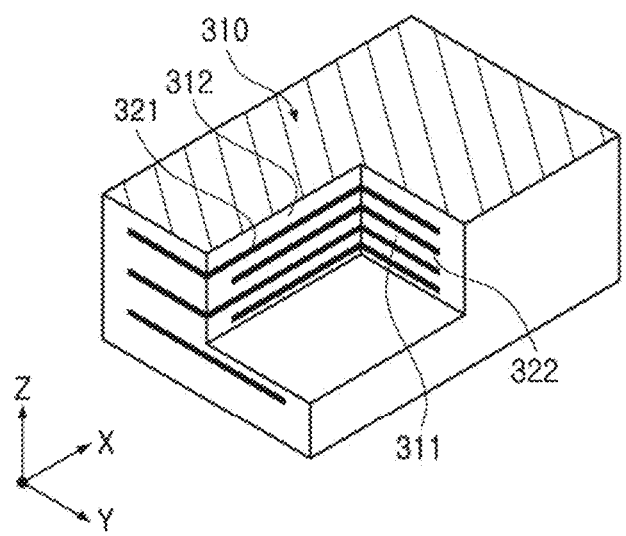
FIGS. 17 through 21 are schematic perspective views illustrating a multilayer ceramic capacitor at various stages of manufacturing using a method for manufacturing a multilayer ceramic capacitor according to another embodiment in the present disclosure.

First, referring to FIG. 17, a body 310 including first and second internal electrodes 321 and 322 facing each other with respective dielectric layers 311 interposed therebetween may be prepared (S210).

Slurry containing powder such as a barium titanate ($BaTiO_3$) powder, or the like, is applied to and dried on a carrier film to prepare a plurality of ceramic sheets.

The ceramic sheet may be manufactured in a sheet form with a thickness of several µm by mixing the ceramic powder such as the barium titanate ($BaTiO_3$) powder, or the like, a binder, a solvent, and the like, to prepare slurry and applying the slurry using by a doctor blade method.

Next, a conductive paste containing a conductive metal may be prepared. The conductive metal may be a single metal such as nickel (Ni), copper (Cu), palladium (Pd), silver (Ag), lead (Pb), platinum (Pt), or the like, or alloys thereof, and a conductive paste for an internal electrode having an average particle size of 0.1 µm to 0.2 µm and containing 40 to 50 wt % of the conductive metal may be prepared.

An internal electrode pattern may be formed by applying the conductive paste for an internal electrode onto the ceramic sheet using a printing method, or the like. As a printing method of the conductive paste, a screen printing method, a gravure printing method, or the like, may be used, but the printing method is not limited thereto.

A laminate including the first and second internal electrodes 321 and 322 may be formed by stacking the ceramic sheets on which the internal electrode pattern is printed and stacking the ceramic sheets on which the internal electrode pattern is not printed on and below the stacked ceramic sheets. Here, the number of stacked ceramic sheets on which the internal electrode pattern is printed may be adjusted depending on capacitance of the multilayer ceramic capacitor. The ceramic sheets on which the internal electrode pattern is not printed become cover parts 312 disposed in upper and lower portions of the body 310.

Thereafter, the body 310 may be formed by compressing and sintering the laminate.

Figure 18:
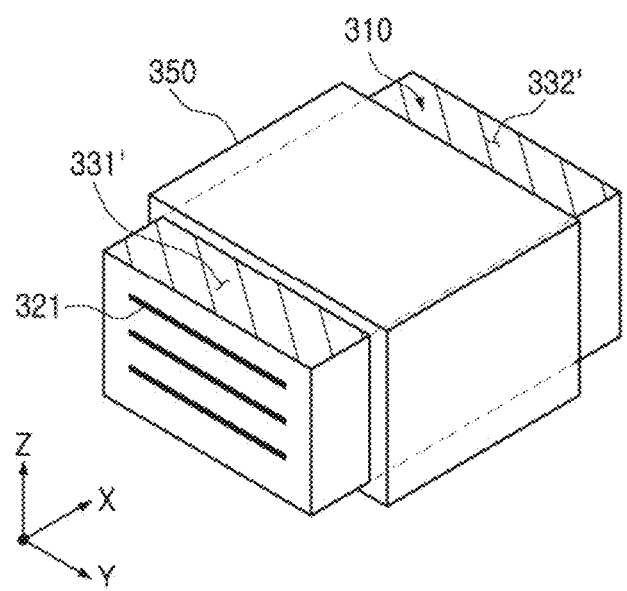

Next, referring to FIG. 18, a protection layer 350 may be formed on the other portion of the body except for first and second external electrode formation regions 331' and 332'.

Here, the first and second external electrode formation regions 331' and 332' may mean portions (band portions) extended from first and second end surfaces of the body 310 in a length (X) direction to surfaces of the body 310 adjacent to the first and second end surfaces of the body 310.

The protection layer 350 may be formed using a polymer resin, for example, an epoxy, but is not limited thereto.

The protection layer 350 may be disposed in a band shape on a central portion of the body 310 in the length direction.

Figure 19:
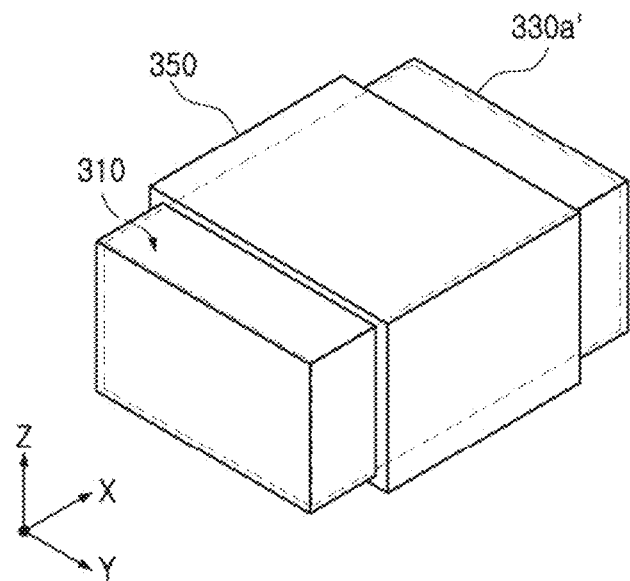

Referring to FIG. 19, after the protection layer 350 is formed, a first electrode layer 330a' may be formed on the first and second external electrode formation regions 331' and 332' of the body 310 (S230).

The first electrode layer 330a' may be formed using a thin film method such as a sputtering method, a chemical vapor deposition (CVD) method, a physical vapor deposition (PVD) method, a spin coating method, an atomic layer deposition (ALD) method, a pulsed laser deposition (PLD) method, or an electroless plating method, but is not limited thereto. Hereinafter, for clarity of explanation, a description will be provided based on a case in which the first electrode layer 330a' is a sputtering layer formed using the sputtering method.

The first electrode layer 330a' may contain any one selected from the group consisting of TiW, TiN, and TaN, or a combination thereof.

That is, since the first electrode layer 330a' contains any one selected from the group consisting of TiW, TiN, and TaN, or the combination thereof, in the forming of the second electrode layer to be described below, the second electrode layer may be easily adhered to the body 310, and diffusion of metal atoms contained in the second electrode layer to the internal electrode may be prevented.

The first electrode layer 330a' may be formed to have a thickness of 30 nm to 70 nm.

Figure 20:
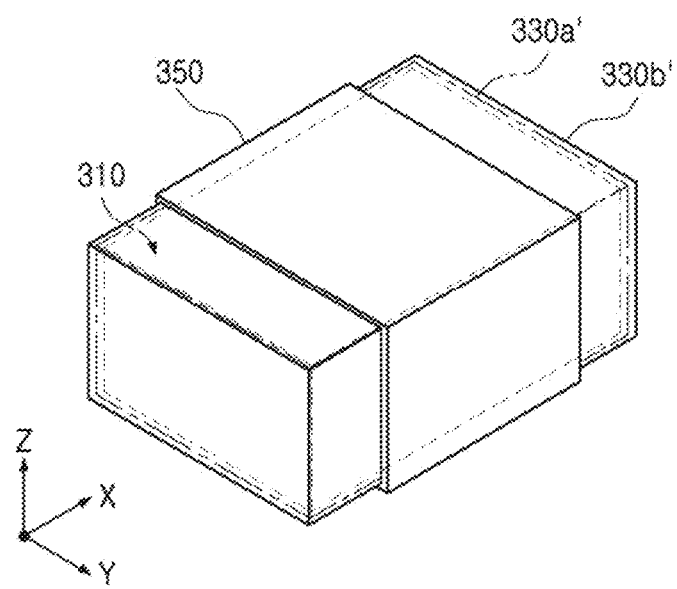

Next, referring to FIG. 20, a second electrode layer 330b' may be formed on the first electrode layer 330a' (S240).

The second electrode layers 330b' may be formed using a thin film method such as a sputtering method, a chemical vapor deposition (CVD) method, a physical vapor deposition (PVD) method, a spin coating method, an atomic layer deposition (ALD) method, a pulsed laser deposition (PLD) method, or an electroless plating method, but is not limited thereto. Hereinafter, for clarity of explanation, a description will be provided based on a case in which the second electrode layer 330b' is a sputtering layer formed using the sputtering method.

The second electrode layer 330b' may contain any one selected from the group consisting of Cu and Al, or alloys thereof.

That is, since the second electrode layer 330b' contains any one selected from the group consisting of Cu and Al, or the alloy thereof, electrical conductivity of the external electrodes may be improved.

The second electrode layer 330b' may be formed to have a thickness of 0.5 μm to 3 μm.

Figure 21:
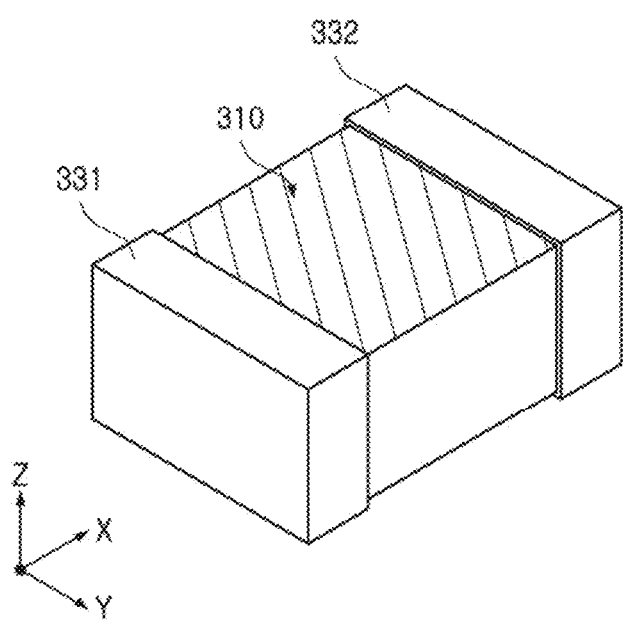

Finally, referring to FIG. 21, first and second external electrodes 331 and 332 disposed on an external surface of the body 310 may be formed by removing the protection layer 350 (S250), such that the multilayer ceramic capacitor may be completed.

Thereafter, if necessary, plating layers may be formed on the first and second external electrodes 331 and 332, but are not limited thereto.

The method for manufacturing a multilayer ceramic capacitor according to another embodiment in the present disclosure described above may have advantages in that the external electrodes may be deposited at once on end surfaces, side surfaces, and main surfaces of the body 310 without separately forming electrode layers on the end surfaces in order to improve connectivity between the internal electrodes and the external electrodes, and a paste is not used, and thus, there is no need to perform the sintering of the electrodes.

As set forth above, according to embodiments in the present disclosure, since in the multilayer ceramic capacitor, each of the first and second external electrodes includes the first electrode layer containing any one selected from the group consisting of TiW, TiN, and TaN, or the combination thereof; and the second electrode layer disposed on the first electrode layer, the efficient volume ratio may be increased by thinning the external electrodes of the multilayer ceramic capacitor, and at the same time, durability of the first and second external electrodes against diffusion and moisture resistance reliability of the first and second external electrodes against the plating solution may be improved.

While embodiments have been shown and described above, it will be apparent to those skilled in the art that modifications and variations could be made without departing from the scope of the present invention as defined by the appended claims.

What is claimed is:

1. A multilayer ceramic capacitor comprising:
   a body including first and second internal electrodes facing each other with respective dielectric layers interposed therebetween; and
   first and second external electrodes disposed on an external surface of the body and electrically connected to the first and second internal electrodes, respectively,
   wherein each of the first and second external electrodes includes:
   a first electrode layer; and
   a second electrode layer disposed on the first electrode layer,
   any one selected from the group consisting of TiW, TiN, and TaN, or a combination thereof, is contained in the first electrode layer of the first external electrode, is in direct contact with the first internal electrode, and is disposed between the second electrode layer of the first external electrode and the body, and
   any one selected from the group consisting of TiW, TiN, and TaN, or a combination thereof, is contained in the first electrode layer of the second external electrode, is in direct contact with the second internal electrode, and is disposed between the second electrode layer of the second external electrode and the body.

2. The multilayer ceramic capacitor of claim 1, wherein the second electrode layer contains any one selected from the group consisting of Cu and Al, or alloys thereof.

3. The multilayer ceramic capacitor of claim 1, wherein the second electrode layer of the first external electrode is in direct contact with the first electrode layer of the first external electrode, and the second electrode layer of the second external electrode is in direct contact with the first electrode layer of the second external electrode.

4. The multilayer ceramic capacitor of claim 1, wherein the first electrode layer has a thickness of 30 nm to 70 nm.

5. The multilayer ceramic capacitor of claim 1, wherein the second electrode layer has a thickness of 0.5 μm to 3 μm.

6. The multilayer ceramic capacitor of claim 1, wherein the first and second electrode layers are sputtering layers.

7. The multilayer ceramic capacitor of claim 1, further comprising a plating layer disposed on the second electrode layer.

8. The multilayer ceramic capacitor of claim 1,
   wherein a ratio of thickness of the second electrode layer of the first external electrode to the first electrode layer of the first external electrode is in a range from 7 to 100, and a ratio of thickness of the second electrode layer of the second external electrode to the first electrode layer of the second external electrode is in a range from 7 to 100.

9. The multilayer ceramic capacitor of claim 8, further comprising a plating layer disposed on the second electrode layer.

10. The multilayer ceramic capacitor of claim 8, wherein the second electrode layer comprises one or more selected from the group consisting of Cu and Al.

11. The multilayer ceramic capacitor of claim 8, wherein the second electrode layer has a thickness of 0.5 μm to 3 μm.

12. The multilayer ceramic capacitor of claim 8, wherein the first electrode layer has a thickness of 30 nm to 70 nm.

* * * * *